United States Patent [19]

Bierwith

[11] Patent Number: 4,579,494

[45] Date of Patent: Apr. 1, 1986

[54] FLEXIBLE LOCKING PIN

[76] Inventor: Robert S. Bierwith, 1331 Eastshore Hwy., Berkeley, Calif. 94710

[21] Appl. No.: 554,597

[22] Filed: Nov. 23, 1983

[51] Int. Cl.$^4$ ............................................. F16B 21/00
[52] U.S. Cl. .................... 411/512; 411/377; 411/513; 411/901; 37/142 A
[58] Field of Search ............. 411/511, 337, 356, 357, 411/512, 513, 900, 903, 904, 901, 909, 377, 383, 385, 439, 473; 37/142 A

[56] References Cited

U.S. PATENT DOCUMENTS

| 563,969 | 7/1896 | Kempshall | 411/377 |
| 998,669 | 7/1911 | Bayuk | 411/357 X |
| 1,620,193 | 3/1927 | Coates | 411/377 |
| 2,279,960 | 4/1942 | Terry | 411/356 X |
| 2,724,303 | 11/1955 | Holcomb | 411/900 X |
| 2,968,840 | 1/1961 | Morse | 411/901 X |
| 2,987,332 | 6/1961 | Bonmartini | 37/142 A X |
| 2,991,569 | 7/1961 | Launder | 411/512 X |
| 3,382,005 | 5/1968 | Kiefer | 411/512 X |
| 3,511,126 | 5/1970 | Watts | 411/512 |
| 3,520,224 | 7/1970 | Hensley et al. | 411/512 |
| 3,526,049 | 9/1970 | Nichols | 37/142 A |
| 4,087,928 | 5/1978 | Mickus | 37/142 A |
| 4,129,934 | 12/1978 | Gettman | 37/142 A X |
| 4,155,665 | 5/1979 | Kaarlela | 37/142 A X |

FOREIGN PATENT DOCUMENTS

| 59167 | 4/1891 | Fed. Rep. of Germany | 411/513 |
| 1175713 | 12/1969 | United Kingdom | 37/142 A |
| 1332323 | 10/1973 | United Kingdom | 411/513 |

Primary Examiner—Thomas J. Holko
Assistant Examiner—Rodney M. Lindsey
Attorney, Agent, or Firm—Bruce & McCoy

[57] ABSTRACT

An elongated flexible locking pin having one rounded and one flat end with the pin being made in two semi-cylindrical halves of different diameter and bonded together by a rubber substance which also covers the flat end of the pin and a small portion of the length of the pin adjacent to the flat end.

1 Claim, 3 Drawing Figures

U.S. Patent　　Apr. 1, 1986　　4,579,494
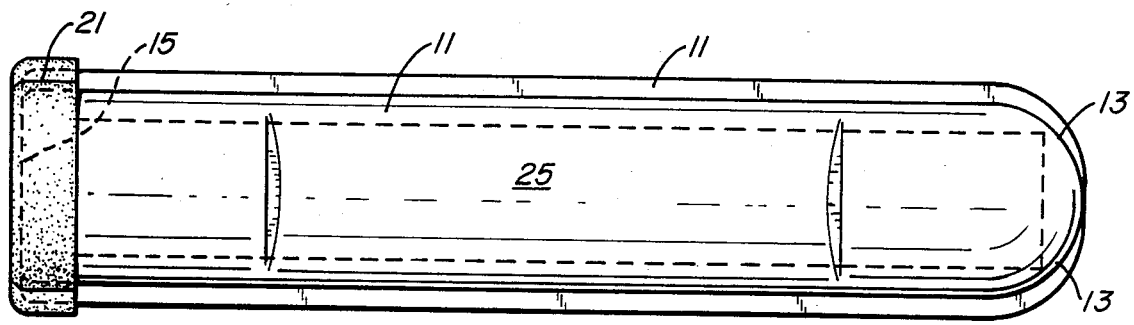
FIG._1.
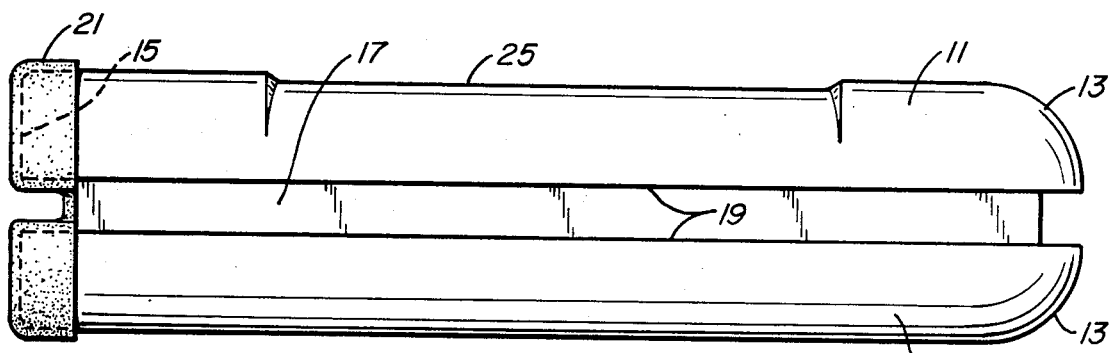
FIG._2.
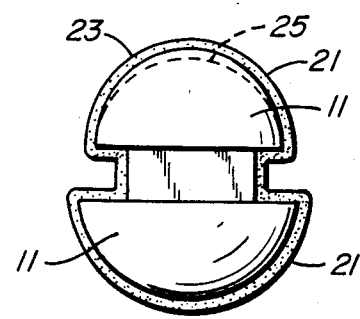
FIG._3.

though the holes can be forced into better alignment they cannot be completely aligned, or the holes

FLEXIBLE LOCKING PIN

BACKGROUND OF THE INVENTION

1. Field of the Invention

The present invention relates to locking pins which are utilized to hold two parts of a machine together. More particularly, the present invention relates to a flexible locking pin which can be compressed to fit into a hole smaller than the pin's external dimensions and has a protective cover secured to the end of the pin to which force is applied to insert the pin into the hole.

2. Description of the Prior Art

Locking pins have been used for almost as long as machinery has been made as a means of holding two different parts together. However, in some instances it is difficult to arrange the parts so that the holes in the two parts through which the locking pin is to be inserted completely align, and it is therefore necessary to use the pin itself to force the holes into alignment. In the past, a pointed pin has been used for the purpose of wedging the pieces into alignment to solve the problem.

In some instances there can be a problem in which even though the holes can be forced into better alignment they cannot be completely aligned, or the holes may be slightly smaller than the pin to be inserted in them, or the holes may be deformed as a result of the parts being utilized in destructive environments. In these specialized cases, there is a need for a flexible and expandable pin which can be driven into a misaligned or deformed pair of holes so that when the pin aligns the holes it will fill them and provide a secure interlock between the parts to maintain the alignment and to keep the pin from dropping out of the hole. Locking pins must be inserted into the alignment holes with force. It is safest to insert them with hydraulic pressure, but usually they must be inserted in the field by hammering on one end of the pin. Often pieces splinter off of the end as a result of this hammering and this poses a serious danger to the operator or bystanders. The present invention solves these problems as well as being able to be inserted into holes slightly smaller than the extended maximum diameter of the pin.

SUMMARY OF THE INVENTION

The present invention is an improved elongated flexible locking pin which is made in two semi-cylindrical pin halves which are bonded together in parallel relationship by means of a compressible substance which also shrinks when refrigerated. The pin halves are rounded at one of their ends for penetration and alignment of the pieces into which the pin is to be inserted and flat at the other ends of the halves to provide a driving surface for a hammer or other tool used to insert the pin into the parts. The bonding material allows the pin to be compressed before it is inserted into the holes in the parts and to expand to fill the holes when the parts are aligned and it covers the flat ends of the pin halves and a small portion of the length of the pins to prevent splinters from flying off the ends of the pins when they are being hammered into the holes.

OBJECTS OF THE INVENTION

It is therefore an important object of the present invention to provide a flexible locking pin which can align holes in two different elements and after effecting the alignment fill the resulting pin hole to maintain the interlock between the parts.

It is another object of the present invention to provide a locking pin which has a flat driving surface that is provided with a shielding means to prevent pieces from flying off the pin while it is being driven into the receptacle and injuring the operator who is driving the pin.

It is a further object of the present invention to provide a flexible locking pin which can be compressed into a hole smaller than the extended maximum diameter of the pin.

Other objects of the present invention will become apparent when the preferred embodiment described herein is considered in conjunction with the accompanying drawings.

DESCRIPTION OF THE DRAWINGS

FIG. 1 is a top plan view of the flexible locking pin of the present invention;

FIG. 2 is a side elevation of the invention shown in FIG. 1 hereof; and

FIG. 3 is an end elevation of the invention shown in FIGS. 1 and 2.

DESCRIPTION OF THE PREFERRED EMBODIMENT

The preferred embodiment of the improved compressible and flexible locking pin of the present invention is made from a pair of elongated pin halves 11. Each of the pin halves is rounded at one of its ends 13 whereby when the two pin halves are aligned in parallel relationship, the rounded ends form an alignment penetration wedge for projecting through the alignment holes in a pair of mated machinery parts. Penetration by the pin through the hole in the first part into a slightly misaligned hole in a second machinery part forces the second hole into alignment with the first hole as a result of the rounded head ramping or wedging and forcing the second part to move or rotate with respect to the first part so the pin can enter into the second hole.

The opposite ends of the pin halves are provided with a flat surface 15 which is the striking surface for a tool which drives the pin into the two machinery parts. Usually the pin halves are driven into place by a hammer and if the hammer strikes the flat of the pin slightly off angle, due to the nature of the hardened steel, it will very likely splinter off a piece of high velocity shrapnel especially dangerous to eyes. To avoid this problem, the pins are often driven into place by hydraulic rams but this is a much more expensive and time consuming procedure and is not practical with smaller size locking pins.

The two halves of the elongated locking pin of the present invention are bonded together in parallel relationship by means of a slightly compressible substance 17 which also has the property of shrinking slightly when refrigerated. In the preferred embodiment, the substance is butyl rubber which can be glued to the flat surfaces 19 of the pin halves. The term "bonded" as used in this disclosure describes the active role performed by the substance which fills the space between the pin halves and does not relate to the glue interface between the pin surface and the compressible substance except as it is required to interlock the three elements of the invention (the substance and the two pin halves).

The bonding substance in addition to securing the pin halves together, also covers 21 the adjacent flat ends of the pin halves for a small portion of their length in order to prevent the metal splinters generated by inaccurate hammer strikes on the pin from flying off and injuring the operator who is attempting to insert the pin into the holes in the parts. The bonding substance also does not extend completely the full length of the space between the pin halves all the way to the rounded ends thereof. This is in order to permit the rounded ends of the pin halves to project in cantilevered opposed configuration whereby they can be squeezed together easier when the pin is being driven into the pin holes of the parts being secured together. In other words, the two cantilevered ends of the pin halves which have nothing between them can be compressed towards each other more easily than the remaining body portions of the pin halves which are separated by the bonding substance.

The compressible substance disposed as the bond between the pin halves does not extend to the lateral edges of the halves but is recessed therefrom so that when the material is compressed it still is contained within the diameter of the pin halves and does not bulge out and contact the parts that are being held together by the pin.

The two pin halves are formed with generally semi-cylindrical external surfaces 23 which transition into flat opposing surfaces 19 that are bonded together. The generally cylindrical surfaces in the preferred embodiment are of different diameters for primarily two different reasons. One of the reasons is that if the pin is to be inserted into a hole that is smaller in diameter than the maximum cross-sectional dimension of the pin, which is measured along a vertical center line in FIG. 3 of the drawings, the pin will fit within the hole after it has been compressed therein.

The other reason is that in some instances, it is preferred to have a particular alignment of the pin within a hole, so the hole for receiving the pin is formed with a configuration having two different diameters of generation. The reason for a particular pin orientation is usually to insure that the pin is aligned in the hole in such a way that as the parts tend to move with respect to each other and force the holes out of alignment, that the pin is compressed by forces which are imposed upon the pin normal to their flat surfaces which is perpendicularly up and down in FIG. 3. These forces would compress the pin and the bonding substance rather than what would be the case if the pin were aligned 90° to that orientation whereby the forces exerted by the relative movement of the parts expose the pin halves to shear forces that are metal to metal rather than cushioned by the rubber interface disposed between the pin halves.

The outer surface of one of the two pin halves can also be provided with a relieved cylindrical center section 25 which does not extend out to the diameter of the end portions of the pin half so that when the pin is engaged in the slot and extends beyond the two pieces to be held together, or if the pin engages three surfaces (a smaller middle hole and two larger end holes), the two end portions of the pin act as stops preventing the pin from being withdrawn from the holes unless the pin is compressed before removal therefrom. In the preferred embodiment, this relief section is formed on the smaller diameter of the pin halves.

It will be seen from this description of the preferred embodiment of the invention that all of the objects and advantages attributable thereto have been obtained, and while the invention has been described in considerable detail herein, the invention is not to be limited to such details as have been set forth except as may be necessitated by the appended claims.

I claim:

1. An improved compressible and flexible locking pin comprising two elongated pin halves which are flat at one end of said pin, said pin halves being bonded together in parallel relationship by means of a slightly compressible substance, said substance also covering the flat ends of said pin halves and extending for a small portion of the length of said pin halves adjacent to said flat ends.

* * * * *